United States Patent
Iyer et al.

(10) Patent No.: US 8,305,958 B2
(45) Date of Patent: Nov. 6, 2012

(54) DELEGATED NETWORK CONNECTION MANAGEMENT AND POWER MANAGEMENT IN A WIRELESS DEVICE

(75) Inventors: Mahesh D. Iyer, Sunnyvale, CA (US); Venkat B. Rao, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 679 days.

(21) Appl. No.: 12/216,889

(22) Filed: Jul. 11, 2008

(65) Prior Publication Data
US 2009/0022068 A1    Jan. 22, 2009

Related U.S. Application Data

(60) Provisional application No. 60/929,888, filed on Jul. 16, 2007, provisional application No. 61/046,170, filed on Apr. 18, 2008.

(51) Int. Cl.
*H04W 4/00* (2009.01)
(52) U.S. Cl. ......... 370/328; 370/338; 709/203; 709/217
(58) Field of Classification Search ................. 370/328, 370/310, 338, 463; 709/203, 217, 223
See application file for complete search history.

(56) References Cited

U.S. PATENT DOCUMENTS

| | | | |
|---|---|---|---|
| 6,868,071 B1* | 3/2005 | Jensen et al. .................. 370/256 |
| 2003/0200372 A1* | 10/2003 | Doragh et al. ................ 710/305 |
| 2006/0052100 A1* | 3/2006 | Almgren ..................... 455/432.1 |
| 2006/0172758 A1* | 8/2006 | Ishii et al. ...................... 455/522 |
| 2007/0049338 A1* | 3/2007 | He et al. ......................... 455/557 |
| 2007/0254588 A1* | 11/2007 | Lafuente ...................... 455/41.2 |
| 2007/0299929 A1* | 12/2007 | Nielsen ......................... 709/217 |

* cited by examiner

*Primary Examiner* — Jung Park
(74) *Attorney, Agent, or Firm* — Sterne, Kessler, Goldstein & Fox PLLC

(57) ABSTRACT

A method and system for advanced media access control delegated from a host device, such as a WiFi device, to a smart wireless communications module. In an embodiment, the host signals to the wireless module a list of one or more preferred networks. The wireless module offloads from the host the processing required to scan for the preferred network(s), as well as possibly other management tasks. The wireless communications module may automatically reassign the network connection from an existing network to a preferred network, or may report to the host when a preferred network is discovered. In either case, the wireless communications module may monitor the wireless environment, and scan for preferred networks, in parallel with maintaining an existing connection. The method and system allows rapid adaptation to a changing network environment, and enables lower system power consumption by distributing management functions between the host and the lower-powered wireless communications module.

32 Claims, 7 Drawing Sheets

DELEGATED NETWORK CONNECTION MANAGEMENT AND POWER MANAGEMENT IN A WIRELESS DEVICE

CROSS REFERENCE TO RELATED APPLICATIONS

This patent application claims the benefit of U.S. Provisional Patent Application No. 60/929,888, filed Jul. 16, 2007, entitled "Low Powered 802.11 Wireless Device," and also claims the benefit of U.S. Provisional Patent Application No. 61/046,170, filed Apr. 18, 2008, entitled "Delegated Network Connection Management And Power Management In A Wireless Device," both of which are incorporated herein by reference in their entirety.

BACKGROUND OF THE INVENTION

1. Field of the Invention

The present invention relates generally to wireless communications. It relates further to advanced media access control (MAC) capabilities and also to power management in a wireless communications device.

2. Background Art

Wireless communications systems, such as wireless-enabled laptop computers, PDAs, portable music players, portable televisions, personal digital assistants (PDAs), WiFi cards, cell phones, and similar mobile digital devices and mobile analog devices pose multiple challenges for design engineers and users alike.

For all portable electronic devices, and for wireless devices in particular, power management is a concern as battery life is always limited. Reduced power consumption means longer battery life and better system performance. Even routine management of an existing network connection can be a significant drain on battery power. Further, maintaining optimum network connections and other network management tasks can consume substantial battery power.

Users in a wireless environment are typically mobile, and so may come in and out of range of wireless access points (APs). Not all APs may support the connections desired by a user, and not all APs provide optimal access (such as high speed wireless links). In addition, other environmental factors, such as a constantly changing multipath environment, may also influence the quality and availability of network connections. Therefore, establishing, maintaining, and optimizing network connections is an ongoing task with significant power demands. For example, if a network connection is lost altogether, substantial power may be consumed simply by continuing to monitor a "dead" network environment, and further power may be consumed by actively sending probes into the network environment to reestablish the connection as quickly as possible.

As another example, if a user is currently linked to a network via a low speed or low quality network connection, a better network connection should be established as soon as it is available. Similarly, a user may be seeking to use a preferred network connection, but may also be willing to use alternative network connections until a preferred network connection becomes available. This may therefore entail searching for the preferred network connection even while an existing network connection is in place.

A closely related challenge lies in maintaining awareness of the network environment. Wireless hardware benefits from knowing the speed and quality of network connections. The wireless hardware and wireless user may benefit from learning of the availability of alternative or additional network connections, apart from a connection the user may have at the current moment. Maintaining this wireless environmental awareness again places significant power demands on the system.

A further challenge is to provide optimized network connectivity and communications management, including reduced power consumption, while not overly taxing the resources of a primary processor of the wireless communications system. Excessive use of a primary processor for network connectivity support may degrade other aspects of system performance.

What is needed, then, is a system and method in a wireless device for advanced wireless network discovery while minimizing system power consumption. Furthermore, it should also provide for advanced management and maintenance of network connections, that simultaneously provides robust, intelligent connection management, and minimizes the impact on a primary processor of the wireless communications system.

BRIEF SUMMARY

The embodiments described herein meet the above-identified needs by providing a system and method for advanced network connection management with lower power consumption. In particular, the configuration described herein distributes network management functions between a host device and a dedicated wireless communications module. In an embodiment, the wireless communications module provides network discovery and connection management functions, relieving the host module of some or all of these responsibilities. This may result in lower system power consumption, more advanced network management features, and more effective use of a processor or processors on the host device. In particular, the host device can use a lower power mode or turn off when not required to support communications functions, resulting in lower overall system power consumption.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears (for example, an element labeled 310 typically first appears in the drawing labeled FIG. 3).

DETAILED DESCRIPTION OF THE INVENTION

Figure 1:
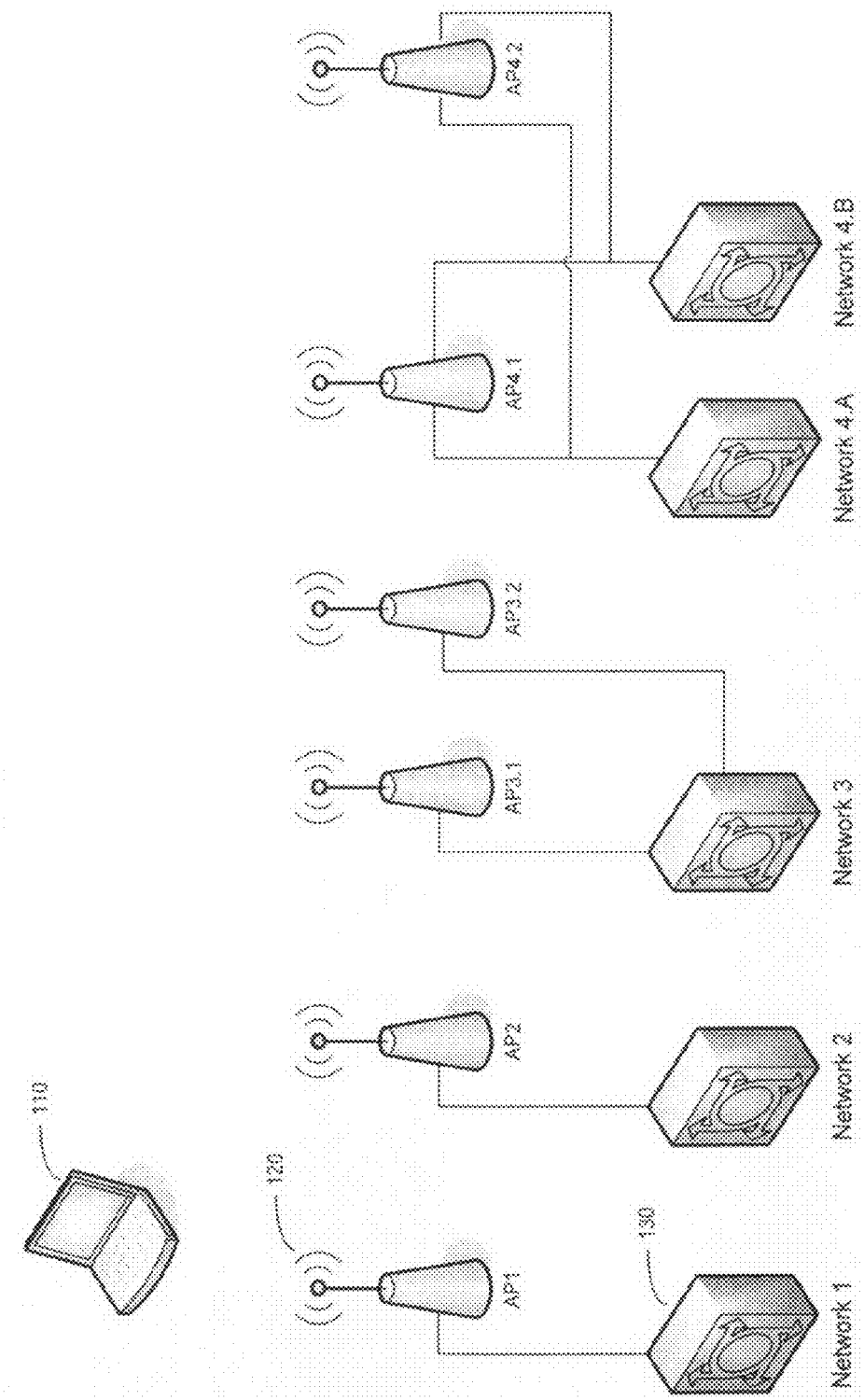
FIG. 1 illustrates an exemplary network environment.

1. Introduction
2. Definitions
3. Exemplary Network Environment
4. Overview
5. Exemplary Wireless Host And Exemplary Wireless Communications Module
6. Exemplary Methods for Delegating Communications and Related Power Management
7. Exemplary Processes for Network Scanning and Association
8. Further Embodiments, Features, and Advantages
9. Exemplary API
10. Conclusion 1. Introduction The present invention is directed to a system and method for advanced media access control delegated in part or in whole from a host device to a wireless communications module. The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

2. Definitions

The following definitions characterize some features, properties, components, behaviors, elements, or functions of the systems or methods discussed in this document. Further defining aspects or characteristics may be introduced in the detailed discussion in remaining portions of this document. In addition, elements so defined may have additional features, properties, components, behaviors, elements, or functions which are not enumerated in this document, but which may be familiar to those skilled in the relevant arts.

Some systems or methods may be defined or characterized here in whole or in part by exemplary instances of such systems or methods (for example, by a particular exemplary type of wireless device, such as an 802.11 enabled device, a personal digital assistant, etc.). It should be understood, however, that such systems or methods may encompass other specific instances or embodiments not listed in the definitions below or elsewhere herein.

Wireless device—The terms "wireless device", "wireless communications device", "wireless communications system", and "wireless system" are used synonymously herein. These terms may typically refer to a self-contained, fully-featured portable device used for processing, transmitting, and/or receiving voice, music, other sounds, still images, video, text, e-mail, Web page content, digital documents, a variety of other digital files, and other data or content matter of interest. Other synonymous terms which may be used in the art include "mobile digital device" and "mobile analog device".

Such devices may include, for example and without limitation, 802.11 enabled devices in general, laptop computers, portable music players, portable televisions, personal digital assistants (PDAs), and similar devices. Devices using other wireless communications protocols, such as Bluetooth or any of several cell phone communications protocols are also wireless devices within the scope of the present system and method. Such devices include some mobile phones, laptop computers, GPS devices, wireless video game consoles, and cell phones.

Such devices may be principally dedicated to communications, or may be principally dedicated to a variety of other data processing tasks but have enabled within a capability for wireless communications (for example, laptop computers, portable music players). Wireless devices typically have a host CPU, which may be configured to support in whole in or in part the communications tasks of the wireless device, but at a minimum is generally capable of supporting higher level network management tasks associated with media access control (MAC) services. Wireless devices may or may not have a radio chip for actual modulation, demodulation, transmission, and reception of the radio frequency (RF) waves used to carry wireless signals; in some cases, they may depend on a wireless communications module (defined below) for a radio chip.

In some cases, the terms "wireless device", "wireless communications system", or "wireless system" may refer to a built-in or removable component part of a larger device, wherein the component part is dedicated to providing wireless communications capabilities and services. For example, a WiFi card, which may be attached to a USB port or inserted into a PCMCIA slot of a laptop computer, may be regarded as a "wireless device" or "wireless communications system".

As used in this document, the terms "wireless device", "wireless communications device", "wireless communications system", or "wireless system" will have a component referred to in this document as a "host" or "host device", defined further immediately below. A wireless device may also have a component referred to in this document as a "wireless communications module" or a "dongle", also defined further below.

"Wireless device" and synonymous terms may refer to a device which operates without the wireless communications module of the present invention. "Wireless device" and synonymous terms may also refer to a device which incorporates the wireless communications module of the present invention. For example, a WiFi card or a PDA, without the wireless communications module of the present invention may be considered a wireless device. Also, a WiFi card or a PDA with the wireless communications module of the present invention may be considered a wireless device.

Host/Host device—The terms "host", "wireless host", and "host device" are used synonymously herein to refer to a wireless device, as defined immediately above, which specifically does not include the wireless communications module of the present invention. However, a host device may be coupled or be capable of being coupled to a wireless communications module.

For example, a WiFi enabled cell phone or a PDA with an SDIO slot for accepting a variety of adapters may be considered a host device. Similarly, a laptop computer configured for wireless communications may be considered a host device. Such host devices may be coupled to the wireless communications module of the present invention by, for example, inserting a suitable adapter into an SDIO slot, PCMCIA slot, USB connector or any other bus interface.

A WiFi card (such as an 802.11 PCMCIA card or 802.11 SDIO adapter) which is configured to accept a wireless communications module (for example, by having a socket on a circuit board which can accept a wireless communications module chip) may be considered a host device. Such a WiFi card may be coupled to the wireless communications module of the present invention by inserting a suitable chip (that is, a suitable integrated circuit) into the socket.

Wireless communications module/Dongle—The terms "dedicated wireless communications module", "wireless communications module", "wireless module", and "dongle" are used synonymously herein to refer to an electronics module which may provide communications services to a host device.

A wireless communications module may be a single microchip or may be a circuit board (possibly enclosed in a case, with suitable connectors) with one or more microchips. A wireless communications module typically comprises or includes a media access control (MAC) device, such as a dedicated MAC chip or a microprocessor programmed or configured to operate as a MAC device. A wireless communications device may include additional elements, such as memory, I/O hardware component (for example, a USB or SDIO interface), possibly a radio hardware component, and possibly other components as well.

In this document, and as described further below, a wireless communications module may be connected or coupled to a host device via a general purpose I/O connection or via a system bus. Such connection or coupling may be via a hard-wired connection (which may therefore place the wireless communications module in a location which is interior to a case or housing of the host device), or by inserting the wireless communications device into a port or slot of the host device, or by attaching the wireless communications device to a port, slot, or similar connector of the host device.

Network—The term "network", as used in this document, may be broadly understood as referring to a wide variety of possible sources of wireless data streams. For example, two different networks may be distinguished as being provided by two different vendors of network services, such as different vendors of WiFi services in a public network environment (for example, AOL vs. Microsoft).

However, in some cases, and for purposes of the present system and method, networks which are distinguished herein as being separate sources of data streams may still be part of a common underlying network system. For example, a first source of low speed data transmission and a second source of high speed data transmission from a common network services vendor may be construed as separate networks.

Access Point/AP—The terms "access point" and "AP", as used synonymously in this document, may refer to any communications node that manages a WiFi network and provides the means for wireless devices to communicate with each other and/or a distributed system (DS). The term "AP" is conventionally used to refer to such nodes for WiFi networks, and the term "base station" or "cell tower" is conventionally used in relation to cellular phone networks. Other terms may be employed in conjunction with other types of wireless networks. APs are typically connected to network servers or other sources of network data via landline connections (for example, via Ethernet).

Network connection—The term "network connection", as used in this document, may refer to an established or potential wireless linkage between a wireless device and a network. As commonly understood in the art, establishing such a linkage may entail creating an authenticated linkage via a handshake process between the wireless device and the network. However, the term "network connection" may also be understood in some contexts to refer to a more local connection between a wireless device and an AP of a particular network. So, for example, when a cell phone changes association from one cell phone tower to another, or when a WiFi device changes association from one AP to another AP of the same network, this may be understood in some contexts as changing a network connection or establishing a new network connection.

Preferred network connection—A "preferred network connection", as the term is used herein, may refer to any network connection which is designated as being preferred over, or prioritized in relation to, other alternative network connections. The designation of a "preferred network connection" may be indicated in real-time during network usage, or may be indicated in advance of any network usage, for example, as a pre-coded list of preferred networks. or may be changed dynamically during network usage.

A preferred network connection may refer to any of several different aspects of network connection including, for example and without limitation, a preferred connection to a specific data source (such as a preferred news service or network server), a preferred connection to a specific network node or network user, a preferred connection to a specific vendor (for example, a specific vendor of wireless services), a preferred network communications protocol (such as 802.11a, or 802.11b, etc.), a preferred network connection speed or data rate, a preferred network security method or protocol, a preferred cost of using a network or linking to a network, or a preferred connection error rate. Other types of network communications preferences may be designated as well.

Preferences among network connections may be designated by a user of a wireless device, by a system administrator of a communications system, by a designer of a network communications device, and other parties. Various priorities may be set among preferred network connections, using a variety of priority systems, and more than one set of preferences and/or priorities may be implemented at a time. Such preferences or priorities among network connections may be stored, maintained, re-prioritized and/or otherwise modified in hardware, software, firmware, and/or any of numerous kinds of dynamic storage as are well known in the art.

The above-enumerated elements of preferred network connections are exemplary only, and other types of preferred network connections and prioritized network connections may be envisioned as well consistent with the present system and method.

For example, at a given time, a wireless device may have a pre-programmed set of priorities among types of network connections (for example, a preference for an 802.11a connection over an 802.11b connection); a network administrator designated set of priorities among network vendors; and a user designated set of priorities among connections to specific data sources and/or network nodes. Consistent with the present system and method, an exemplary wireless device may maintain a first network connection while simultaneously searching for a second network connection which is preferred (that is, has a higher priority) with respect to any one, two, or three of the priorities of network connection type, network vendor, and/or data source/nodes.

Embedded system—The term "embedded system" typically refers to a computer system with a specialized, dedicated function, which may typically be integrated down to a few components. Examples of embedded systems may include cell phones, PDAs, portable media players, and similar devices. As understood in this document and in U.S. Provisional Patent Application No. 60/929,888, filed Jul. 16, 2007 from which the present application claims priority, the combination of a host device and a wireless communications module may be viewed as an embedded system.

However, for purposes of the present invention, the term "embedded system" may also be construed more broadly, and be viewed as synonymous with the term "wireless device" as defined above. The term "embedded system" may therefore encompass, for example, a general purpose computer, such as a personal computer, either without or in combination with the wireless communications module discussed further below.

WiFi—The term "WiFi", as used herein, may refer both to technologies which are based on the IEEE 802.11 communications protocol, and also more generally to technologies which employ communications protocols which may have substantial elements in common with the 802.11 protocol. The 802.11 protocols include the 802.11a, 802.11b, and 802.11g protocols, as well as other related protocols which may currently be under development or may be forthcoming in the future, and which are specified in IEEE documents as is known to persons skilled in the relevant arts. The pertinent IEEE standards for 802.11a, 802.11b, and 802.11g as of the filing date of this application are incorporated herein by reference as if the entire text were reproduced below.

3. Exemplary Network Environment

FIG. 1 illustrates an exemplary wireless network environment 100. In practical application, exemplary network environment 100 may be any kind of public or private space which is designed for wireless network access, for example, for access to a WiFi network. Such environments may include, for example and without limitation, offices, airports, train stations, factories, internet cafés, any outdoor environment configured for wireless capabilities (such as any outdoor environment providing cellular phone support), and similar environments.

Exemplary environment 100 may include one or more wireless devices 110 configured for user access to wireless networks. FIG. 1 illustrates an exemplary wireless device 110 which may, for example, be a WiFi enabled mobile communications device including, for example and without limitation, a personal digital assistant (PDA), a laptop computer with built-in WiFi or a WiFi card, a portable music player, a wireless television receiver, a cell phone, or one of many kinds of similar wireless devices. Other examples of wireless devices 110 may include various kinds of portable medical monitoring and reporting devices, a variety of portable communications devices used in law enforcement and/or military applications, location determination devices (such as those associated with the Global Positioning System (GPS)), and a variety of wireless technologies which may be used in various industrial and enterprise contexts for such purposes as inventory tracking and monitoring.

A wireless device 110 may contain within, or have attached to it, a wireless communications module (not illustrated), or may have a port or card slot configured to access a wireless communications module, such module being discussed below in greater detail in conjunction with FIG. 2 below.

Network environment 100 may also contain one or more access points (APs) 120 configured to transmit and receive network information, and which are typically also configured to support a plurality of wireless devices 110. As noted above, examples of APs may include WiFi APs, cellular towers used in cell phone networks and other wireless applications, and similar distribution points for wireless signals.

Network environment 100 may support one or more networks 130 which provide data to APs 120 for broadcast, and which also receive data from wireless devices 110 via APs 120. Persons skilled in the relevant arts will recognize that various hardware, not illustrated, may be required to support network activities in network environment 100. Such hardware may include but is not limited to network servers, authentication servers, routers, modems, and various kinds of radio frequency (RF) equipment. Persons skilled in the relevant arts will further recognize that in some cases hardware associated with networks 130 may be substantially collocated with APs 120. In other cases, hardware associated with networks 130 may be remote from APs 120 and linked to APs 120 via cabling such as electrical cables or fiber optics cables.

For purposes of the present invention, networks 130 may be viewed as sources of data for wireless transmission by APs 120 and sinks for data received at APs 120, the latter data being received from wireless devices 110.

Exemplary network environment 100, as illustrated in FIG. 1, may provide access to a plurality of networks, or to a plurality of network configurations, or both. For example, a first network, Network 1, may be linked to a first AP, AP1, while a second Network 2 may be linked to a second AP, AP2. A third network, Network 3, may be linked to a plurality of APs, such as AP3.1 and AP3.2. Further, a plurality of networks, such as Network 4.A and Network 4.B, may be accessed through a plurality of APs, such as AP4.1 and AP4.2.

Persons skilled in the relevant arts will recognize that the above connections between networks 130 and APs 120 are exemplary only. In general, a given AP 120 may provide access to a plurality of networks 130, and a given network may be accessible via a plurality of APs 120.

It will be further apparent to persons skilled in the relevant arts that between various APs 120, what may vary may be not only the available networks 130, but also the quality of service. Quality of service factors for a network connection may include the speed of network connection, the security level of network connection, the types of services supported by a network connection, the connection reliability and bandwidth guarantees, and other factors which may affect the nature and quality of the network connection available to a user of a wireless device 110.

The above-named network connection factors may also vary depending not only on the particular AP, but also depending on variable factors within the network environment. For example, movement of objects within a network environment can affect the link quality. In addition, factors entirely external to the network environment may affect network connections. For example, a given network may temporarily go offline for a variety of reasons (for example, due to power failures, disruptions in communications lines, network server crashes, problems with intermediary or linking networks, deliberate electronic network attacks, etc.), only to become available again at a later time.

As a result, for a user in network environment 100, both networks 130 and the quality of network connections available to the user's wireless device 110 may vary over time, and may also vary as the user physically moves through the network environment 100. The user may have preferences among various network connections, with various priorities regarding those preferences. Consequently, it is desirable that wireless device 110 be capable of adapting to a network environment which changes over time, and moreover wherein the nature and quality of network connections may change as the user moves through the environment.

4. Overview

According to embodiments of the present invention, power consumption of a wireless communications device, such as the exemplary wireless device of FIG. 1 (element 110) and FIG. 2 (discussed below), can be lowered by distributing management functions between a host module with a primary processor and a wireless communications module with a secondary processor. In an embodiment, the wireless communications module may perform network discovery and connection management functions. Offloading these tasks from the primary processor of the host module to the secondary processor of the wireless communications module can be used to lower power consumption. In particular, the host module may use a lower power mode or be turned off altogether for periods of time, resulting in lower overall system power consumption.

In addition, when network discovery and connection management functions are offloaded to a wireless communications module, the wireless communications module can be configured to assist the host module with power management functions. In particular, the wireless communications module can assist the host module in making power management decisions regarding system components, including a host bus controller and/or a communications port controller at the wireless communications module itself. For example, the wireless communications module can assist the host module to make power management decisions when no network is discovered, when no data is available (excluding management packets), and in the smart adaptive scan mode (described below).

Further, offloading network discovery and connection management functions to the wireless communications module allows higher-level applications running on the primary processor to quickly switch between networks, when necessary. In an embodiment, a "background scan" is used at the wireless communications module even when the system is associated with a network, so that the overall system (that is, the wireless device) always has full awareness of all available network connections.

5. Exemplary Wireless Host and Exemplary Wireless Communications Module

Figure 2:
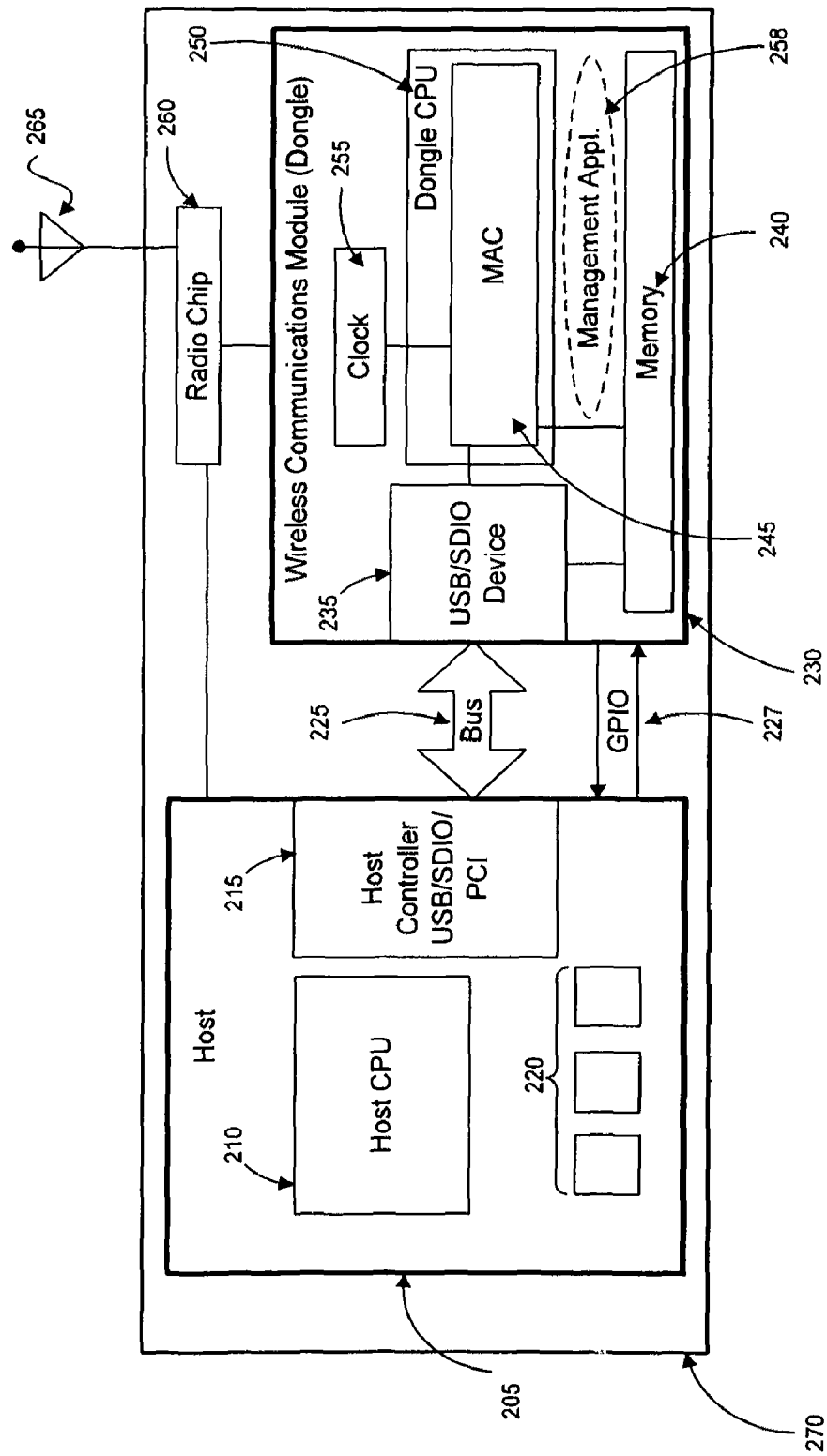
FIG. 2 illustrates an exemplary wireless host coupled with an exemplary wireless communications module according to an embodiment of the present invention.

FIG. 2 is a block diagram of an exemplary wireless device 110, which may for example be a WiFi device or a WiFi enabled device, a Bluetooth or Bluetooth enabled device, a cell phone, or other wireless device. Exemplary wireless device 110 may comprise an exemplary host device 205 and an exemplary wireless communications module 230 which may also be known as exemplary dongle 230. Host 205 and wireless communications module 230 are coupled by an exemplary bus 225. Bus 225 enables signal and data communications between host 205 and wireless communications module 230. Host 205 and wireless communications module 230 may also be coupled by an exemplary general purpose input/output (GPIO) connection 227, which may use less power than bus 225, and possibly provide slower data communications rates than bus 225. GPIO 227 may be used, among other purposes, for enabling a wake-up or power-up signal from wireless communications module 230 to host 205 and/or bus 225 and vice-versa, if any of host 205, wireless communications module 230, and/or bus 225 have been previously powered-down.

Host 205 and wireless communications module 230 may be structurally contained in a surrounding exemplary case 270. Case 270 may also include any number of ports, buttons, control devices, or other user-interface elements, not illustrated. Exemplary wireless device 110 also includes an exemplary antenna 265, which may be either interior to or exterior to case 270.

Exemplary host 205 includes an exemplary host central processing unit (CPU) 210. Host 205 further comprises an exemplary host bus controller 215. Bus controller 215 controls electronics necessary for communications over bus 225. For example, host bus controller 215 may be a controller for a USB port, SDIO port, a PCI bus, or similar bus or connector.

Host 205 may also comprise any number of additional chips, elements, or components schematically represented as elements 220. Host CPU 210 may perform any number of tasks pertaining to the general purpose or general operations of wireless device 110. For example, for a cell phone, host CPU 210 may perform tasks related to digital signal processing and other management tasks related to sending and receiving a telephone call. For a general purpose laptop computer, host CPU 210 may perform all the tasks necessary to support software operations and the running of programs on the laptop computer. For a specialized wireless device 110, such as a portable music player, host CPU 210 may have additional special operations to support such tasks as the playback of music.

In a wireless device 110 which does not have a wireless communications module 230 that provides and manages wireless network connectivity (to various degrees), host CPU 210 may be further configured to support a variety of high level communications tasks. For example, host CPU 210 may be configured to support those tasks which are typically associated with media access control (MAC) operations in a communications device. A disadvantage of such a configuration is that it may consume substantial bandwidth or substantial resources on host CPU 210 to support such communications tasks. As a consequence, host CPU 210 may draw substantial power in order to support those communications tasks. Further, by supporting communication tasks on host CPU 210, the performance of host CPU 210 may be degraded with respect to other tasks which are to be performed by host CPU 210.

The present system and method addresses this potential drain on the resources on the host CPU 210 by introducing a wireless communications module, such as exemplary wireless communications module 230. As already indicated, wireless communications module 230 is coupled to host CPU 205 via bus 225. Wireless communications module 230 may include such elements as an exemplary media access control (MAC) element 245, an exemplary memory 240, an exemplary input/output device such as exemplary USB/SDIO device 235, and an exemplary clock 255.

These various exemplary components (MAC 245, memory 240, USB/SDIO device 235, and clock 255) are coupled to each other as necessary in order to support the operations of wireless communications module 230. The connections or couplings between these components as illustrated in FIG. 2 are exemplary only, and other couplings are possible. In some embodiments of the present system and method, MAC 245, memory 240, USB/SDIO device 235, and clock 255 may be on separate integrated circuits (ICs). In some embodiments of the present system and method, some or all components of wireless communications module 230 may actually be on a single chip or single IC.

In some embodiments of the present system and method, MAC 245 may be a dedicated MAC chip or chips. In other embodiments of the present system and method, MAC 245 may actually be implemented via a general purpose central processing unit (CPU) 250. CPU 250 may be referred to as "dongle CPU 250" or "wireless communications module CPU 250". In such an embodiment, dongle CPU 250 may be configured to operate as a MAC 245 via instructions stored in memory 240. In particular, management communications tasks discussed in further detail below in this document may be encapsulated in an application or application software referred to as exemplary management application 258.

Management application 258 is illustrated in FIG. 2 with a dotted-line bubble, representing its role as software. Persons skilled in the relevant arts will recognize that management application 258 may be implemented via dedicated hardware, via firmware, and/or via software, and may be embodied and implemented via one or more of MAC 245, dongle CPU 250, and/or memory 240, along with possibly other components. Management application 258 may be implemented as a computer program product implemented on a computer readable medium that causes dongle CPU 250 to implement various instructions.

Persons skilled in the relevant arts will recognize that in many wireless applications, the MAC functionality is partitioned between an upper MAC and a lower MAC. In an embodiment, many of the operations and features of management application 258 of the present system and method would be implemented or supported via an upper MAC, but in some embodiments some or all features may be implemented, or supported in part or in whole, via a lower MAC as well. In the remainder of this document it will be indicated only that features of the present system and method are implemented via MAC 245, which may in turn be implemented in part or whole via dongle CPU 250, it being understood that the partition of specific features or operations between an upper MAC and a lower MAC may be implementation dependent.

In an embodiment of the present system and method, MAC 245 or dongle CPU 250 are specifically configured to be electronics which draws less power than host CPU 210 of host 205. For example, in one embodiment of the present system and method, dongle CPU 250 may be implemented with a microprocessor which is less complex or has a simpler architecture than host CPU 210. For example, dongle CPU 250 may be smaller in physical size, have fewer transistors, have smaller on-board cache memory and/or fewer cache levels, have fewer pipelines, have a narrower internal bus width, have fewer microprocessor cores, or have other architectural and design differences as compared with host CPU 210. The different architecture results in overall reduced power consumption for dongle CPU 250 as compared with host CPU 210 based on suitable comparisons (for example, a comparison of the power consumed by each CPU when performing the same, substantially similar, or analogous processing tasks).

In an alternative embodiment, dongle CPU 250 may be the same or substantially similar in complexity or architecture to host CPU 210, but dongle CPU 250 may be run at a slower clock speed than host CPU 210 while still enabling dongle CPU 250 to fully and effectively perform all tasks required of dongle CPU 250. In an alternative embodiment, dongle CPU 250 may use a component-level architecture (for example, a type of transistor logic) which inherently draws less current or less voltage than that employed by host CPU 210. In an alternative embodiment, dongle CPU 250 may employ a combination of the above-indicated techniques (that is, have a simpler architecture, run at a slower clock speed, and/or implement a reduced current or voltage component-level architecture) as compared with host 205 and/or host CPU 210.

Other means of achieving reduced power consumption of dongle CPU 250 or MAC 245 as compared with host CPU 210 may be envisioned as well. As a consequence, and apart from any other power saving features of the present system and method, any communications operations or any processing which is performed by wireless communications module 230—and in particular those operations performed by MAC 245 or dongle CPU 250—will inherently draw less power than would be drawn by host CPU 210 in performing the same operations.

MAC/CPU 245/250 of wireless communications module 230 is configured or is programmed to perform a variety of high level tasks for the purpose of managing and establishing network associations between wireless device 110 and network environment 100. As already indicated, these features, capabilities, and related programs may be implemented in a management application 258. The details of some of these exemplary network connection and network connection management operations will be described further below in conjunction with FIGS. 3 through 7.

A further component of exemplary wireless device 110 is exemplary radio chip 260. Radio chip 260 may configured to modulate outgoing wireless messages for transmission via antenna 265. Radio chip 260 may be further configured to demodulate transmissions received via antenna 265. As illustrated in FIG. 2, radio chip 260 is coupled to host 205 or to wireless communications module 230, or to both.

Persons skilled in the relevant arts will recognize that, depending on the particular configuration of wireless device 110, radio chip 260 may in fact be physically a part of host 205. In an alternative embodiment radio chip 260 may be part of wireless communications module 230. In an alternative embodiment, a first radio chip 260 may be part of host 205 and may be used by host 205 for communications when wireless communications module 230 is not installed. However, wireless communications module 230 may have its own radio chip 260 which may be put into use in place of or along with radio chip 260 associated with host 205.

In addition to its function for managing network connections and maintaining network connections, exemplary wireless communications module 230 is further configured to provide power management services to wireless device 110. Wireless communications module 230 may send power management commands or power management recommendations to host 205 via bus 225, or if bus 225 is not available (for example, because bus 225 has been previously powered down) then via GPIO 227. Wireless communications module 230 may be further configured to provide power management control commands or power management recommendations to radio chip 260.

In addition, wireless communications module 230 may be configured to provide power management control to itself. For example, if it is determined that communication services are not required with the host module for a period of time, wireless communications module 230 may shut down power or reduce power to USB/SDIO device 235. Similarly, if wireless communications services are not required for a period of time, a MAC/CPU component 245/250 of wireless communications module 230 may reduce power or shutoff power for a lower MAC component of MAC 245.

6. Exemplary Methods for Delegating Communications and Related Power Management

Figure 3:
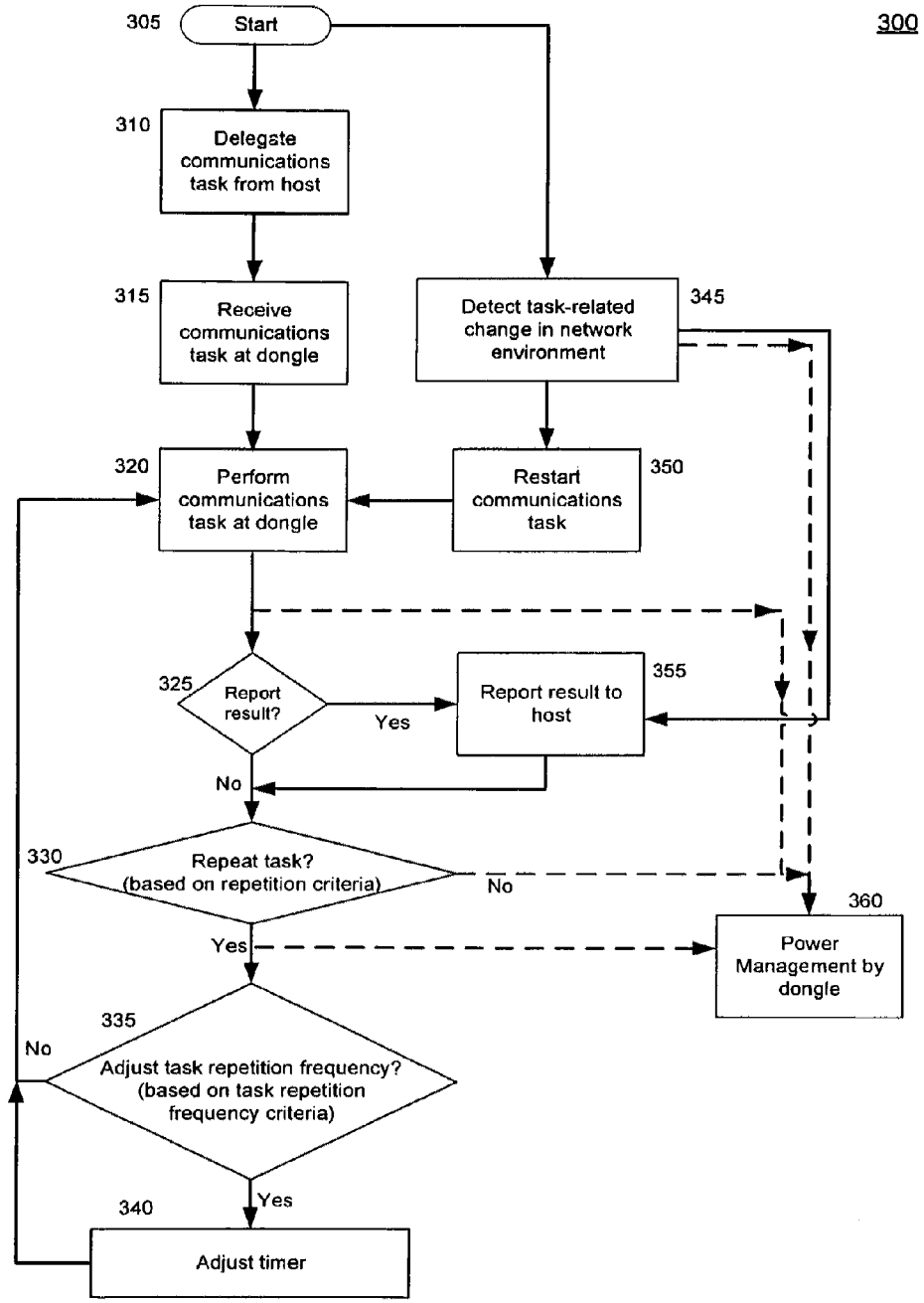
FIG. 3 is a flowchart of an exemplary process for delegating communications tasks from a wireless host to a wireless communications module according to an embodiment of the present invention.

FIG. 3 illustrates an exemplary general method 300 for network connection and power management on a wireless device 110 which employs a wireless communications module 230 coupled with a host 205.

Method 300 starts at step 305.

At step 310 a communications task is delegated from host 205 to wireless communications module 230. A communications task, for example, may be a task to establish a network connection or to establish a preferred network connection from among a list of prioritized network connections. Detailed exemplary communications tasks are discussed later in this document.

In step 315 the delegated communications task is received at wireless communications module 230.

At step 320 wireless communications module 230 performs the communications task. Following step 320, a power management task 360 may be performed by wireless communications module 230. The details of power management task 360 are described in further detail below in conjunction with exemplary method 400 of FIG. 4.

At step 325 a determination is made as to whether or not a result or outcome of the delegated task is to be reported back to host 205. This determination may, for example, be based on an indication in the originally delegated task as to whether results need to be reported from wireless communications module 230 to host 205. If results are to be reported, then at step 355 results are reported from wireless communications module 230 to host 205. The method then continues at step 330. If at step 325 results of the task are not to be reported, method 300 continues directly with step 330.

At step 330 a determination is made as to whether or not the delegated task may need to be repeated. This determination may be based on several factors. First, it may be determined whether or not any repetition criteria were included in the original task. For example, if the task is to establish a network connection, the task may further comprise the detailed steps of searching for a suitable network connection and then establishing the network connection. If the network has not been found, it may be necessary to repeat the task of searching for the network connection. In general, at step 330 a determination is made as to whether the task has any steps which may require repetition; then a further specific determination may be made as to whether repetition is required based on the results of performing the task or attempting to perform the task.

In one embodiment, if no repetition of the task is necessary, step 330 may continue with step 360 which may entail determining whether or not power management actions are required by wireless communications module 230. If power management actions are required, they are performed at step 360. The details of the power management task 360 are described in further detail below in conjunction with exemplary method 400 of FIG. 4.

In an alternative embodiment, even if a repetition of the task is necessary, step 330 may still be followed by power management step 360, as well as by step 335 (determine if task frequency is to be adjusted) and possibly step 340 (adjust task frequency) discussed below.

If in step 330 it is determined that a task needs to be repeated, method 300 continues with step 335.

At step 335 a determination is made as to whether the task repetition frequency should be adjusted. Some tasks may have associated with them a repetition frequency wherein, depending on the outcome of the task, the frequency of the task should be repeated or the frequency of the task should be reduced. The frequency in question is a frequency in time at which a task should be performed. (It is not a frequency associated with a repetition of a cycle of an electro-magnetic wave.)

If in step 335 it is determined there is no need to adjust the repetition frequency, then method 300 continues by returning to step 320 where the communications task is performed again. If at step 335 it is determined that an adjustment needs to be made to the repetition frequency, then a suitable adjustment is made at step 340. For example, a timer which determines the timing between repetitions of the delegated task may be adjusted to establish the new repetition frequency.

Method 300 has a second beginning path starting at step 305. In the second path, method 300 may continue with step 345.

In step 345, wireless communications module 230 detects a task-related change in network environment 100. Step 345 may continue with step 350. As a result of the task-related change, at step 350 a communications task is restarted. Method 300 then continues with step 320, which entails performing the communications task at wireless communications module 230.

Further in response to detecting a task-related change in the network environment at step 345, method 300 may continue with power management step 360. Power management step 360 is discussed further below in conjunction with method 400 of FIG. 4.

Finally, as a result of a detected change in network environment 100, step 345 may continue with step 355, which may report the change to the host 205.

As discussed above, step 330 determines whether a communications task is to be repeated. If the determination is that no repetition is needed, then step 330 continues with step 360 of power management. If in step 330, if it is determined that repetition is needed, then in a first embodiment step 330 continues with step 335 (related to task frequency, as discussed above), and does not continue with step 360.

In an alternative embodiment, even if at step 330 it is determined that repetition of the communications task is required (entailing a continuation to step 335), step 330 may also continue with step 360 of dongle power management. Following step 330, step 360 of dongle power management may be performed before step 335, or step 360 may be performed substantially concurrently with step 335, or step 360 may be performed after step 335.

In one embodiment of the present system and method, step 335 of determining whether to adjust task repetition frequency, and possibly step 340 of adjusting task repetition frequency, may occur independently of step 360 of power management.

In an alternative embodiment, specific decisions involved in steps 335/340 (pertaining to task repetition frequency), and specific decisions involved in step 360 (of power management) may be linked. In the latter embodiment, and as will be recognized by persons skilled in the relevant arts, necessary code, data, and/or operational logic may be shared between steps 335/340 and step 360 to achieve both suitable task repetition frequency and power management. As an exemplary case, a decision to reduce power consumption may entail, in whole or in part, a decision to reduce a frequency at which a task is repeated.

In exemplary method 300 as illustrated in FIG. 3, links from various steps (such as steps 345, 320 and 330) to power management step 360 are illustrated with dotted lines. These dotted lines indicate that there may be a variety of paths to power management step 360, some of which may be optional, and that other paths may be employed in the alternative to or in addition to those shown. Persons skilled in the relevant arts will appreciate that, depending on the nature of a particular task or depending on the nature of a detected change in network environment 100, power management may be initiated at any number of points during a particular method or process. Thus, the steps illustrated leading to power management step 360 are exemplary only.

Persons skilled in the relevant arts will further appreciate that in general the steps illustrated for method 300 are exemplary. Fewer steps, additional steps or steps performed in a different order may still be substantially within the scope and spirit of the present system and method.

Figure 4:
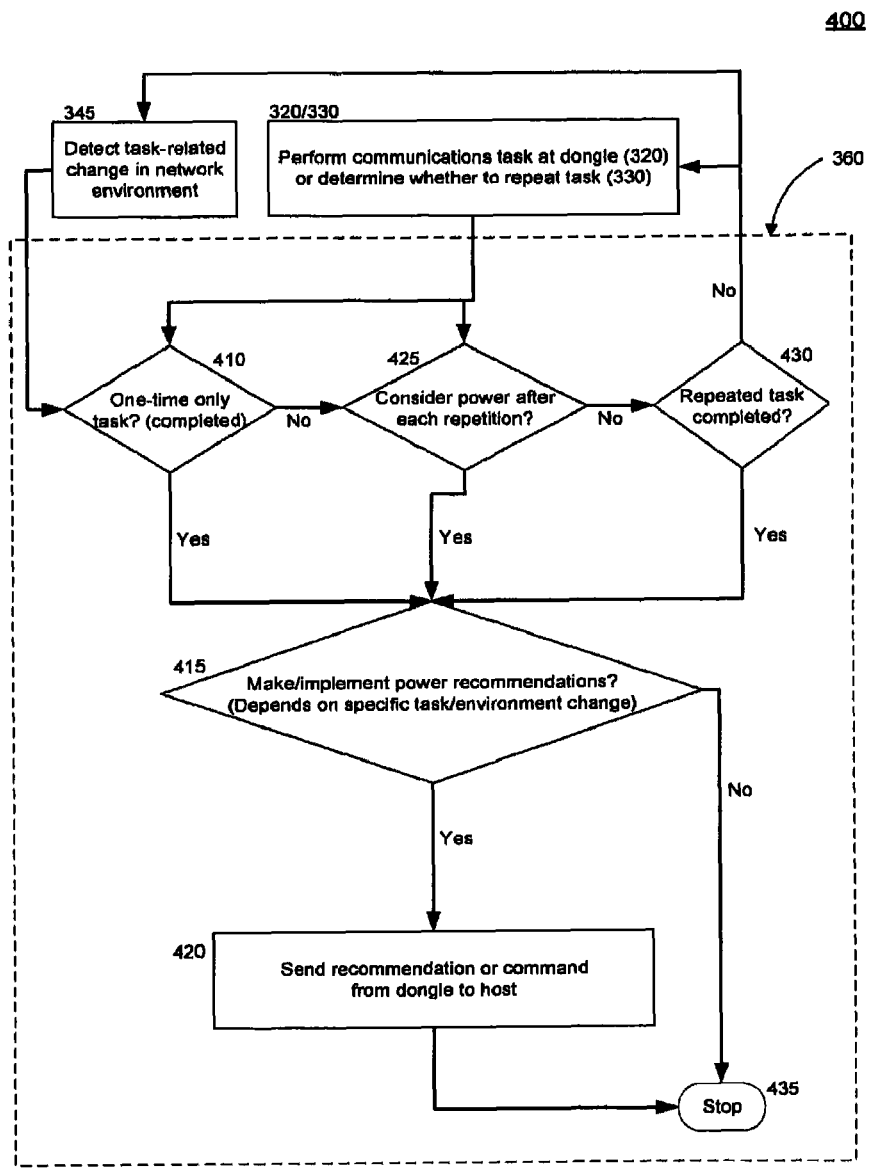
FIG. 4 is a flowchart of an exemplary power management process associated with delegating communications tasks from a wireless host to a wireless communications module according to an embodiment of the present invention.

FIG. 4 illustrates an exemplary method 400 for power management by a wireless communications module 230 which may regulate, control, or recommend power activities both for itself and for a host module 205.

In method 400, steps 345 and 320/330, already discussed above in conjunction with method 300, are repeated as possible starting points. (Steps 320 and 330 are combined into one element in method 400, as they both represent performance of a communications task or possible performance of a communications task, which may be followed by a power management task 360.) Referring back to FIG. 3, in step 345 a task-related change in the network environment is detected.

In step 320 a communications task is performed by wireless communications module 230. From either step 320 or step 345, method 400 continues with step 360, the step of power management, of method 300. As discussed above, in one embodiment of the present system and method, even if at step 330 it is determined that repetition of the communications task is required (entailing a continuation to step 335), step 330 may also continue with step 360 of dongle power management.

As shown in FIGS. 3 and 4, the decision as to whether to evaluate power considerations after each repetition of a communications task is illustrated as being step 425 of method 400 in FIG. 4. However, persons skilled in the relevant arts will recognize that this is exemplary only, and that such a decision could be incorporated as an element of method 300 of FIG. 3, or could be distributed in a variety of ways across methods 300 and 400.

Specific, exemplary component steps within step 360 are described immediately below.

Starting with step 345 as an entry point into step 360, at step 345 a task-related change in the network environment is detected. For example, a change may be detected wherein a preferred network connection is not found or wherein no network connection is detectable, or a change may be found in which a network connection has become available after a period of time when no network connection was previously available. In any of these cases, it may be desirable to either decrease or stop power being supplied to certain system components, or to increase or start power delivery to certain system components.

Step 345 may be followed by step 410. At step 410 a determination is made as to whether the detection task was a one time only task which has been completed. If the detection task has been completed the method continues with step 415.

At step 415 a determination is made as to whether a power recommendation should be made or whether a power policy should be implemented. The exact decision will depend upon a specific task and a specific environmental change. For example, if the task is to detect that no network connection is available after a period of time in which there has been a network connection available, the power policy or power recommendation may be to power down certain chips which support communications tasks. Similarly, if a determination is made that a network connection is now available after a period of time when a network connection was not available, the power policy or power recommendation may be to deliver power or increase power delivery to certain components which perform certain communications task.

Similarly, a decision as to whether wireless communications module 230 will only recommend a power policy to host CPU 210, or whether on the other hand wireless communications module 230 will actively implement a power policy, may depend on how wireless communications module 230 has been previously configured, either for a recommendation role or for an active power management role.

If in step 415 it is determined that it is appropriate to make or implement a power recommendation, the method continues with step 420. At step 420 a recommendation or command is sent from wireless communications module 230 to host device 205 to implement or recommend a power recommendation.

For example, wireless communications module 230 may discover that a network connection is not currently available. In that event, a recommendation may be sent from wireless communications module 230 to host device 205 to implement a policy to enter a sleep mode or otherwise reduce power consumption, due to the lack of network availability and consequent lack of need for data processing. Or, for example, it may be that a network connection has not been available for some past period of time, but a network connection is now currently found by wireless communications module 230. In that event, a recommendation may be sent from wireless communications module 230 to host device 205 to implement a policy to enter a wake mode or otherwise increase power consumption, in preparation for processing of network data by host device 205.

If at step 415 a determination is made that no power policy should be recommended or implemented then the method stops at step 435.

Returning to step 410, if the detection task is not a one time only task, the method may continue at step 425. At step 425 a determination is made as to whether power policy should be evaluated after each repetition of a detection cycle. This assumes that there is a task for environmental monitoring which is repeated more than once, and further that at the conclusion of each repetition some detection may be made of a change in the network environment.

If at step 425 power policy is to be evaluated after each repetition of the detection task, then the method continues with step 415. As described above, step 415 and following steps entail a determination as to whether a power recommendation should be made or power policy implemented, depending on a specific detected condition of the environment.

Returning to step 425, if it is determined that a power policy or power recommendation should not be evaluated after each repetition of a task, then the method continues at step 430. At step 430 a determination is made as to whether the repeated task is completed. In other words, a determination is made as to whether or not the task which is to be repeated has been repeated for the final time. If the task has been completed for the final time (for example, if a final monitoring has been done of the environmental condition), then the method continues at step 415, already described above.

If at step 430 the repeated task is not completed (meaning that there are additional repetitions of the task to perform), then the method continues at either step 345 (again detecting a task-related change in the network environment) or at step 320 (performing a communication task at wireless communications module 230).

As noted above, method 400 may also start at step 320, which entails performing a communication task at wireless communications module 230. Following step 320, power management or power recommendations may commence either at step 410 (which entails determining if the task is a one time only task and has been completed); or power management or power recommendations may commence at decision step 425 (where a determination is made as to whether to consider power management or power recommendations after each repetition of the task).

As already described in detail above, steps 410, 425 and 430 all entail determinations as to whether a task is completed or whether a repeated task is completed; and also, possibly, determinations as to whether power management or power recommendations should be considered after each repetition of a repeated task. If determinations are made in the affirmative for any of steps 410, 425 or 430, the method continues with step 415. In step 415 a determination is made depending on the specifics of the task at hand as to whether to make a power policy recommendation, or to implement a power policy.

In some embodiments, environmental detection, task performance, and power management may occur at substantially the same time, and the order of steps described above with regards to exemplary methods 300 and 400 may not be followed exactly, or may be modified. For example, a wireless communications module 230 may detect at that it is in the vicinity of an AP 120 which is delivering a high powered signal. A task-related action may be to associate with the high-power signal AP, and a further task-related action may be to reduce the power consumed by a radio chip 260 (for example, by lowering a level of signal amplification required of the chip), or to recommend a reduction in the power required by radio chip 260. These tasks could be performed even when the 802.11 wireless device is already associated to an existing AP.

The exact order in which such steps as association and power reduction may occur may depend on a specific detected condition, a specific connection task, and the specific power-related requirements associated with the detected condition and/or the connection task. It is to be understood, then, that the order of steps described above in conjunction with methods 300 and 400 is exemplary only. The same steps or similar steps may be performed in a different order, within the scope and spirit of the present system and method.

7. Exemplary Processes for Network Scanning and Association

Figure 5:
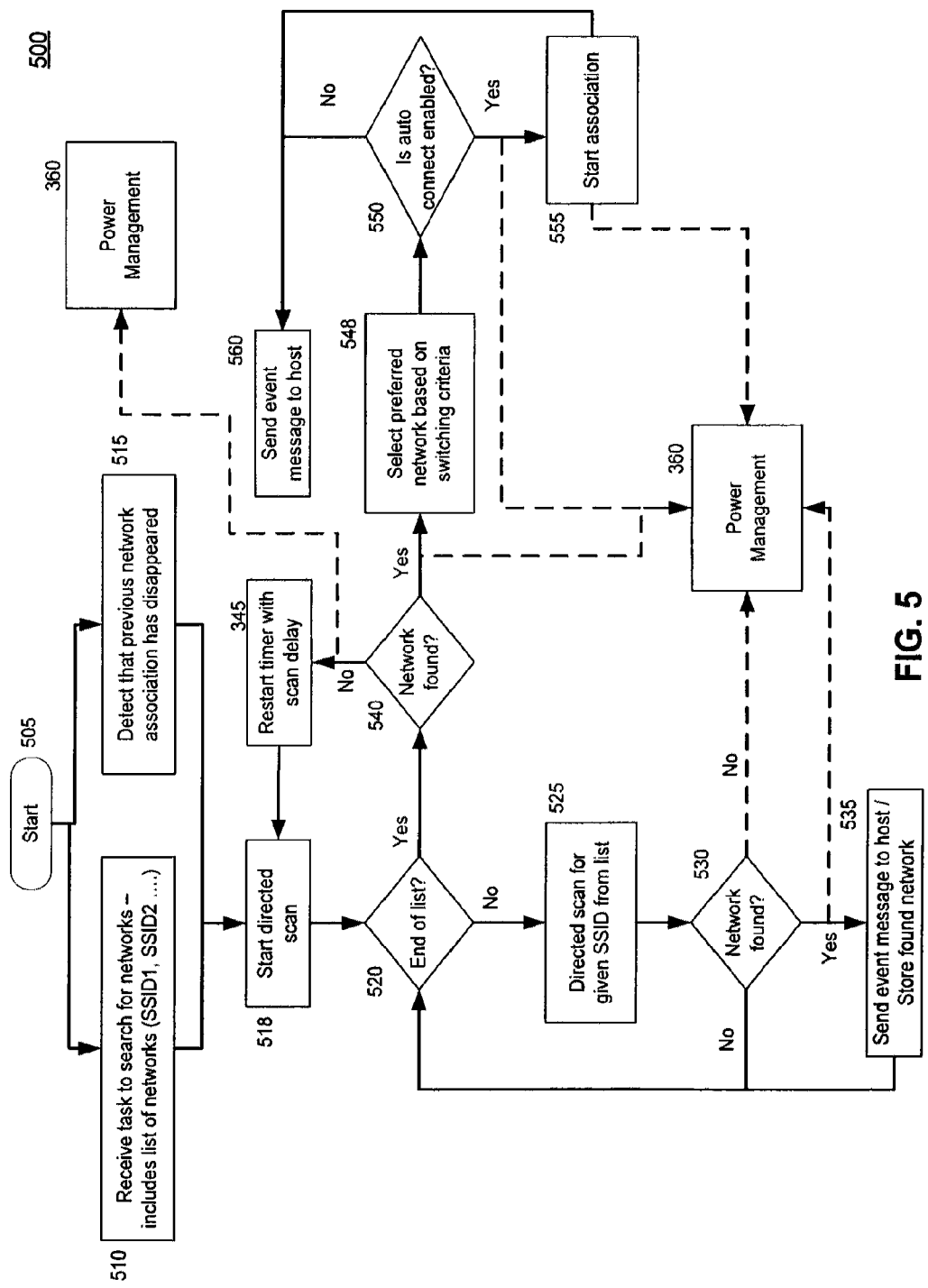
FIG. 5 is a flowchart of an exemplary process for network scanning and association according to an embodiment of the present invention.

FIG. 5 is a flowchart of an exemplary method 500 for network scanning and association according to an embodiment of the present invention. A preferred network scan includes scanning for networks 130 from a list of preferred networks, where the list of preferred networks may be defined or configured by the host module. Exemplary method 500 is performed by wireless communications module 230.

Exemplary method 500 starts at step 505. Method 500 may continue with either step 510 or step 515. At step 510, a search task is received by wireless communications module 230 from host 205. The search task may include several task elements, including for example and without limitation:
  a request to search for a network 130;
  a list of preferred networks to search for;
  at least one criteria to prioritize among the networks in the list of preferred networks;
  additional (for example, secondary, tertiary) criteria to prioritize among the networks in the list of networks.

In an embodiment, the list of preferred networks may include a number of networks listed in order of preference, so that the criteria for prioritizing the networks is simply the order in which the networks are presented in the list.

In an alternative embodiment, other priority criteria may be used. For example, it may be preferred to seek a network 130 with a strongest signal strength, or a network 130 with a highest connection speed, or a network 130 which supports a certain type of data connection (for example, a cellular network which supports both Web and voice access may be preferred over a cellular network which supports only voice access). It may also be preferred to seek a network 130 supported by a particular network vendor. Other priority criteria may be used as well.

The search task may include additional elements as well. For example, the search task may include a request to scan the radio frequency (RF) environment for certain conditions (for example, certain kinds of packets, or for clear channels). The data so obtained may be used, for instance, as part of establishing a priority among networks in the list of networks.

Alternatively, at step 515, wireless communications module 230 may determine that a previous network association is no longer available (in other words, that a previously established network connection has been lost). Therefore, it may be necessary to begin a new network scan based on the same task elements received in a previous search task.

Step 518 entails initiating a directed scan for a preferred network from the list of networks. For example, step 518 may entail initiating a directed scan for a given network identifier, such as a Service Set Identifier (SSID), from the list of preferred network identifiers.

Step 520 includes determining whether the end of the list of preferred networks has been reached. If the end of the list has not been reached, step 525 includes continuing the directed scan for a given network identifier (such as a Service Set Identifier (SSID)) from the list of preferred networks.

At the end of the directed scan in step 525, step 530 includes checking whether or not a network 130 has been found. If no network 130 has been found, the process returns to step 520. Otherwise, if a network 130 has been found, the process proceeds to step 535, which includes sending a message to host 205 to notify host 205 of the discovered network 130, before returning to step 520.

Step 535 may also include adding the found network 130 to a list of found networks maintained in memory 240 of wireless communications module 230. In this way, once the search is completed, wireless communications module 230 will have a list of all preferred networks found during the search.

On other the hand, if in step 520 the end of the list of preferred networks has been reached, the process proceeds to step 540. Step 540 includes checking whether or not a network 130 has been found after having processed the entire list of preferred networks. If no network 130 has been found, the process proceeds to step 545, which includes setting a timer to schedule a future network scan. (This is discussed further below, in conjunction with FIG. 7.) However, if one or more networks have been found, the process proceeds to step 548.

Step 548 includes selecting a network 130 to associate with (from the one or more discovered networks) based on switching criteria. The switching criteria may include:
  the priority criteria received in the search task in step 510; and
  pre-defined rules to control the switching of the system between networks 130.

The pre-defined rules may pertain to any number of factors including, for example and without limitation: the quality or speed of the available network connections, available battery power, historical information on the quality of network connections, connection security level, and other factors. Such rules may be defined in whole or in part by rules built into a non-volatile memory 240 of wireless communications module 230, rules defined by a user, system administrator, or other person associated with host 205, rules defined by driver software of wireless communications module 230, and by other rule sources as well.

Step 550 includes checking whether or not an auto-connect feature is enabled. If auto-connect is enabled, in step 555 wireless communications module 230 automatically associates wireless device 110 with the selected network 130, before sending a message to host 205 in step 560. On the other hand, if auto-connect is not enabled, in step 550 wireless communications module 230 sends a message to host 205. Host 205 may then decide whether to associate with the selected network 130 or not.

In various embodiments of method 500, and consistent with the description already provided above in conjunction with methods 300 and 400, wireless communications module 230 may be configured to initiate power management operations 360 at any of several points during the implementation of method 500. (This is graphically illustrated in FIG. 5 by the use of dotted line connectors between various steps of method 500 and step 360.)

For example, at either step 530 or step 540 (both entailing network discovery determination), if a network is not found or if a network connection is not active, a decision may be made to power down or reduce power to certain elements of host 205 or wireless communications module 230. Similarly, if at either step 530 or step 540 a network is found, or a dormant network connection becomes active, a decision may be made to restore power or increase power to certain elements of host 205 or wireless communications module 230. Decision factors may include, for example and without limitation, the amount of time that has elapsed without finding a preferred network, the number of repetitions of the network search process, whether available packets in the network environment are data packets or management packets, a received power level (such as a received signal strength indication, or RSSI) of an available network, and other factors as well. Similarly, power management operations 360 may be associated with or triggered by step 555, which entails initiating an association between wireless device 110 and a network 130.

While power management operations 360 are illustrated as being possibly associated with steps 530, 540, and/or 555 of method 500, in some embodiments power management operations 360 may not be associated with these steps, or with only one or two of these steps, or may be associated with other steps in the alternative or in addition to steps 530, 540, and/or 555.

Figure 6:
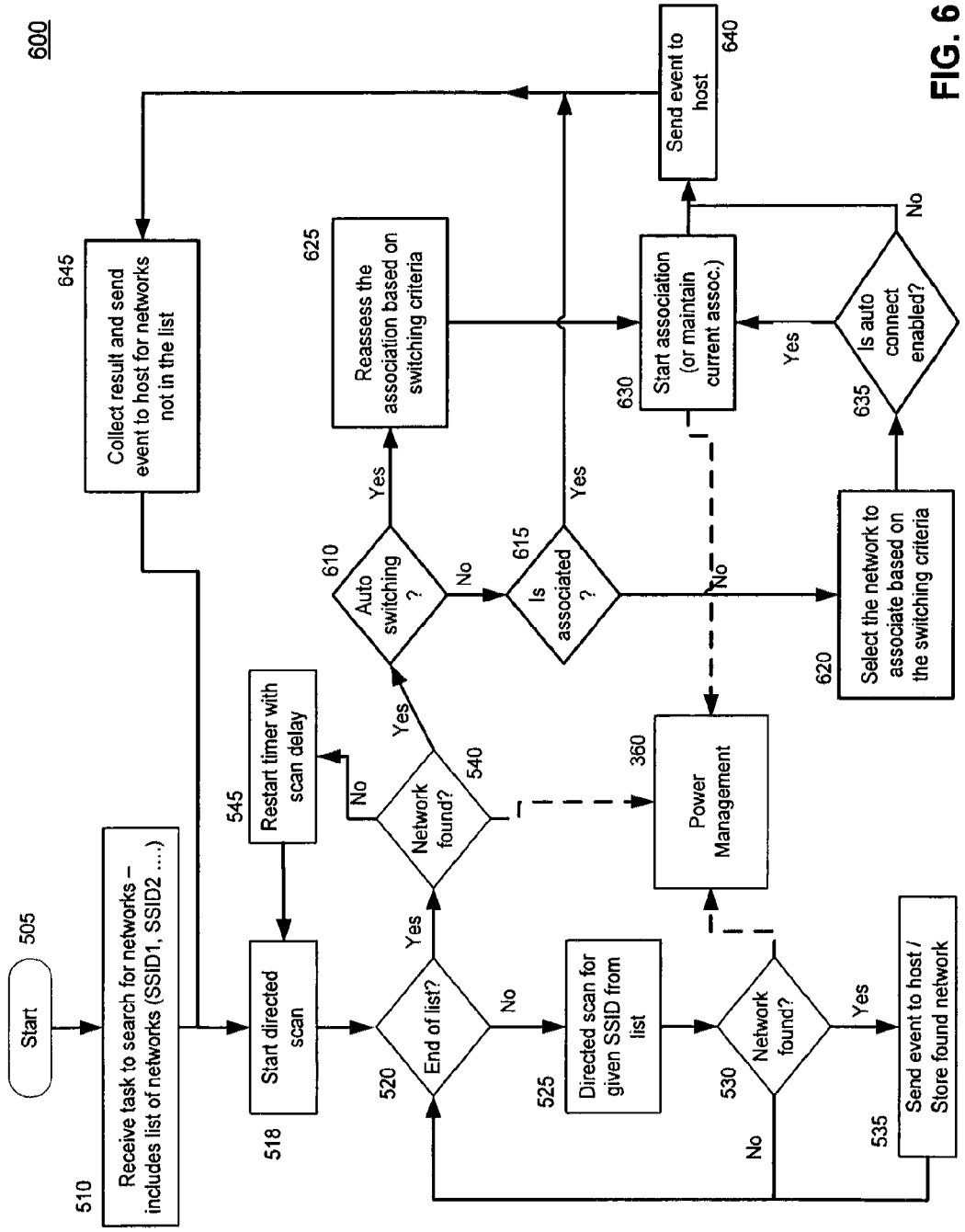
FIG. 6 is a flowchart of an exemplary process for background network scanning and association according to an embodiment of the present invention.

FIG. 6 is a flowchart of an exemplary method 600 for background network scanning and association according to an embodiment of the present invention. A background scan may be used by a management application 258 at wireless communications module 230 to continue to scan for networks even when wireless device 110 is associated with a network 130. This allows management application 258 to automatically switch between networks 130 based on switching criteria (for example, the ordered preference list, other network preference criteria, signal strength, link speed, network, security, and/or other criteria) set by host 205. Further, this allows management application 258 to report to host 205 the availability of networks 130 (both from within or outside the preferred list of networks) or the disappearance of networks 130 from the preferred list, thereby enabling host 130 to make intelligent network association decisions.

Certain steps of exemplary method 600 are the same or similar to steps of exemplary method 500 described above. They are repeated here to provide context. However, some details which are described above in conjunction with exemplary method 500, and which remain applicable to method 600, have nonetheless been omitted for brevity.

Exemplary method 600 starts at step 505. Method 600 continues with step 510, where a search task is received by wireless communications module 230 from host 205. The search task may include several task elements, including for example and without limitation:

- a request to search for a network 130;
- a list of preferred networks to search for;
- at least one criteria to prioritize among the networks in the list of preferred networks;
- additional (for example, secondary, tertiary) criteria to prioritize among the networks in the list of networks;
- an indication, flag, or similar data element to indicate whether or not auto-switching is enabled (auto-switching is discussed further below in conjunction with step 610);
- an indication, flag, or similar data element to indicate whether or not auto-connect is enabled (auto-connect is discussed further below in conjunction with step 635).

The search task may include other elements as well, as described above in conjunction with exemplary method 500 of FIG. 5.

Step 518 entails initiating a directed scan for a preferred network from the list of preferred networks.

Step 520 includes determining whether the end of the list of preferred networks has been reached. If the end of the list has not been reached, step 525 includes continuing the directed scan for a given network identifier from the list of preferred networks.

At the end of the directed scan in step 525, step 530 includes checking whether or not a network 130 has been found. If no network 130 has been found, method 600 returns to step 520. Otherwise, if a network 130 has been found, method 600 proceeds to step 535, which includes sending a message to host 205 to notify host 205 of the discovered network 130, before returning to step 520.

Step 535 may also include adding the found network 130 to a list of found networks maintained in memory 240 of wireless communications module 230. In this way, once the search is completed, wireless communications module 230 will have a list of all preferred networks found during the search.

Returning to step 520, if in step 520 the end of the list of preferred networks has been reached, method 600 proceeds to step 540.

Step 540 includes checking whether or not a network 130 has been found after having processed the entire list of preferred networks. If no network 130 has been found, method 600 proceeds to step 545, which includes setting a timer to schedule a future network scan. (This is discussed further below, in conjunction with FIG. 7.)

However, if at step 540 one or more networks have been found, method 600 proceeds to step 610. Step 610 includes determining whether or not auto-switching is enabled.

If in step 610 auto-switching is enabled, wireless communications module 230 may automatically terminate the present network association, if any, and establish a new network association, without further intervention from host 205. Method 600 may therefore proceed to step 625, which includes re-assessing the network association based on the switching criteria.

Step 625 includes selecting a network 130 to associate with (from the one or more discovered networks) based on switching criteria. The switching criteria may include the priority criteria received in the search task in step 510, and pre-defined rules to control the switching of the system between networks 130. Additional aspects of the switching criteria were discussed above in relation to method 500 (in conjunction with FIG. 5).

Subsequent to step 625, step 630 may include starting an association between wireless device 110 and a preferred discovered network 230, where the association is established by wireless communications module 230. In step 630 wireless communications module 230 automatically associates wireless device 110 with the selected network 130, before sending a message to host 205 in step 640. Step 640 may be followed by step 645, discussed further below.

Returning to step 625, it is possible that in step 625 when the network association is re-evaluated, it is found that the current association is also the preferred association. In this case, the current network association will be maintained at step 630. A message may still be sent at step 640 to host 205 to signal maintenance of the present association. In an alternative embodiment, a message is not sent.

Returning to step 610, if auto-switching is not enabled, method 600 proceeds to step 615, which includes determining whether or not wireless system 110 is currently associated with a network. If wireless system 110 is associated with a network, method 600 continues directly with step 645, a reporting-only step discussed further below. Since auto-switching is not enabled, wireless communications module 230 may not autonomously terminate a current network connection or establish a new network connection.

If in step 615 wireless system 110 is not associated with a network, method 600 proceeds to step 620, which includes selecting a preferred network to associate with (from the one or more discovered networks) based on switching criteria. The details of the switching criteria and associated rules have already been discussed above, and the discussion will not be repeated here.

Subsequent to step 620, step 635 includes determining whether or not auto-connect is enabled. If auto-connect is enabled, method 600 proceeds to step 630. In step 630 wireless communications module 230 automatically associates wireless device 110 with the selected preferred network 130, before sending a message to host 205 in step 640.

On the other hand, if in step 635 auto-connect is not enabled, in step 640 wireless communications module 230 sends a message to host 205. Host 205 may then decide whether to associate with the selected network 130 or not. Step 640 may be followed by step 645.

In step 645, wireless communications module 230 may collect results of network monitoring, which may include both monitoring for preferred networks and additional network monitoring, and report the results in an event message or event messages to host 205.

In various embodiments of method 600, and consistent with the description already provided above in conjunction with methods 300, 400, and 500, wireless communications module 230 may be configured to initiate power management operations 360 at any of several points during the implementation of method 600. (This is graphically illustrated in FIG. 6 by the use of dotted line connectors between various steps of method 600 and step 360.)

For example, at either step 530 or step 540 (both entailing network discovery determination), if a network is not found or if a network connection is not active, a decision may be made to power down or reduce power to certain elements of host 205 or wireless communications module 230. Similarly, if at either step 530 or step 540 a network is found or a dormant network connection becomes active, a decision may be made to restore power or increase power to certain elements of host 205 or wireless communications module 230. Decision factors may include, for example and without limitation, the amount of time that has elapsed without finding a preferred network, the number of repetitions of the network search process, whether available packets in the network environment are data packets or management packets, a received power level (such as a received signal strength indication, or RSSI) of an available network, and other factors as well. Similarly, power management operations 360 may be associated with or triggered by step 630, which entails initiating an association between wireless device 110 and a network 130.

While power management operations 360 are illustrated as being possibly associated with steps 530, 540, and/or 630 of method 500, in some embodiments power management operations 360 may not be associated with these steps, or with only one or two of these steps, or may be associated with other steps in the alternative or in addition to steps 530, 540, and/or 630.

Persons skilled in the relevant arts will recognize that the steps described in methods 500 and 600 are exemplary. In some embodiments, additional steps or alternative steps may be employed to implement the present system and method of network connection management, network background scanning, and associated power management. In addition, some steps may be performed in a different order or omitted altogether without departing from the spirit and scope of the present invention.

According to further embodiments of the present invention, the management application at wireless communications module 230 enables an adaptive scanning algorithm, which may enables wireless system 110 to conserve energy. In a scanning algorithm embodiment 700, illustrated in FIG. 7, adaptive scanning algorithm 700 includes performing directed network scans according to adaptively variable frequencies. (The term "frequency", as used in the present context, refers to a "frequency in time" of performing a step or action pertaining to network scanning, and not "frequency" as a "measure of repetitions of cycles of a radio wave".)

Figure 7:
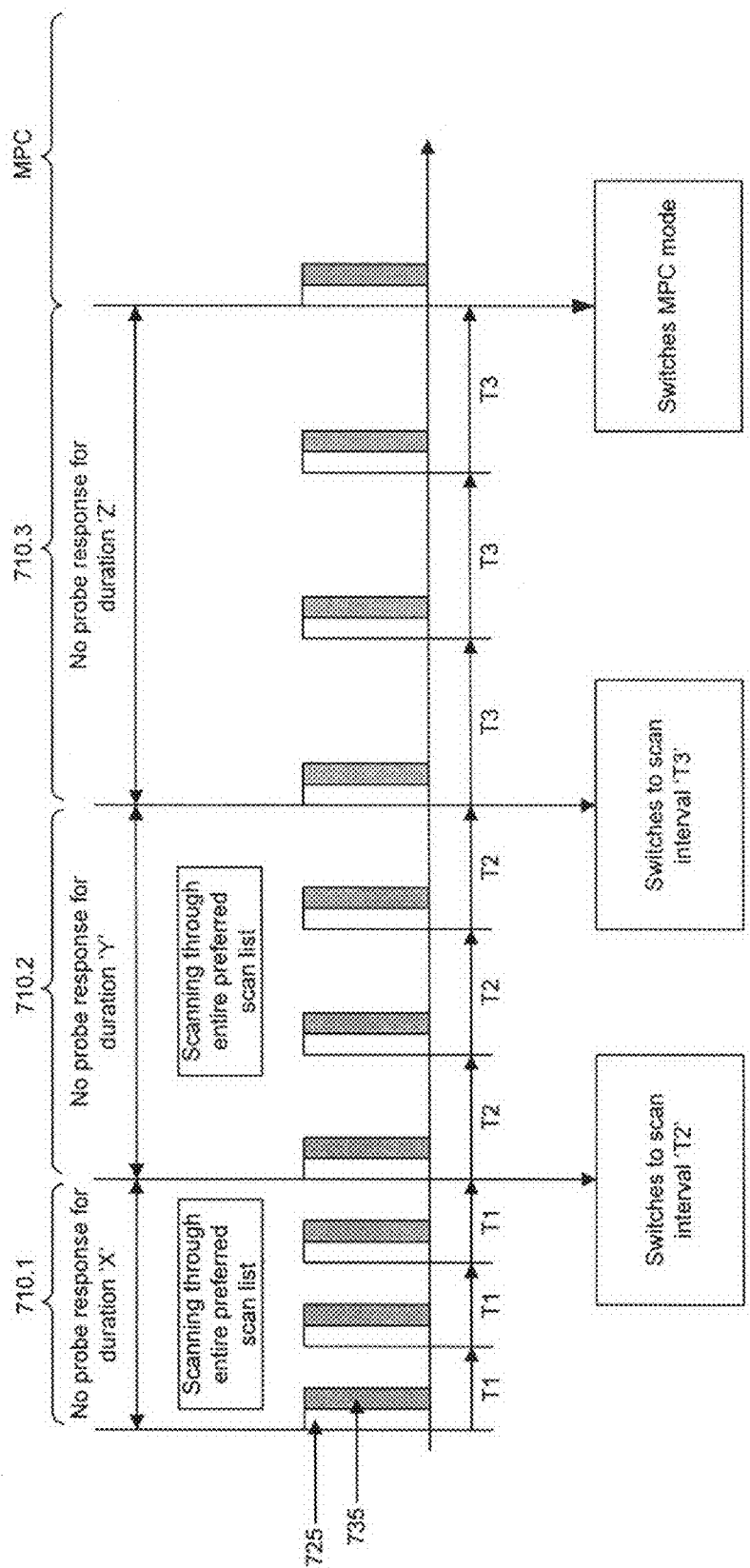
FIG. 7 illustrates an exemplary adaptive scanning algorithm according to an embodiment of the present invention.

For example, as shown in FIG. 7, network scanning may begin by performing a directed network scan, which may entail sending out a probe 725 and scanning for a network response 735. If no network response is received, the probe/scan activity 725/735 may be repeated after a time interval T1 has elapsed from the first probe/scan 725/735. If no response is received, this sequence may be repeated multiple times, each with a time interval T1 between the start of probe/scan 725/735 events.

In an embodiment, a directed network scan 710 may include scanning through the entire preferred network list once. In an alternative embodiment, a directed network scan may entail scanning through the entire preferred network list two times, or a specified number of times. Assuming no network response is received, this sequence, with time intervals T1 between probe scan events, may be repeated over a total time interval spanning a time duration X 710.1, in order to perform one or more directed network scans.

If no probe response is received at the end of time duration X, the scan frequency for directed scan 710 is decreased such that a directed scan or directed scans are performed according to a scanning interval T2, where T2 is larger than T1. As a result, directed scan or directed scans 710.2 may require a total time duration Y, where Y is longer than X. Because the probe/scan events 725/735 are less frequent, less power is consumed per unit time, which may result in a more extended battery life.

Similarly, if no probe response is received at the end of time duration Y, a larger scanning interval T3 is used for a subsequent time duration, where T3 is greater than T2. As a result, directed scan or directed scans 710.3 may require a total time duration Z, where Z is longer than Y. Because the probe/scan events 725/735 are again less frequent than before, less power is consumed per unit time, which may result in a more extended battery life.

In an further embodiment, wireless communications module 230 can enter a minimum power consumption (MPC) mode at the end of time duration Z, for example. An MPC mode may entail, for example, shutting down all wireless communications, probes, and scanning for some extended period of time. An MPC mode may entail reducing power consumption on wireless communications module 230, on the host device 205 (as controlled in whole or in part by wireless communications module 230), or both.

In an embodiment, an MPC mode may entail automatically "waking" the system at infrequent intervals for an additional round of network probing/scanning.

8. Further Embodiments, Features, and Advantages

Further features and advantages according to embodiments of the present invention will now be described.

Embodiments of the present invention include a method to configure network settings within wireless communications module 230. For example, this includes configuring a number of preferred network settings. In an embodiment, preferred network settings include full support for several security types, including, for example, Open, WEP, WPA, and WPA2 encryption.

Further, configuration of preferred network settings can be performed using configurable parameters, where network specifications may contain meta-specifications to cover more than one particular network. These preferred network settings may be delegated to wireless communications module 230, for example at step 310 of exemplary method 300 (see FIG. 3 above), and received by wireless communications module 230, for example at steps 315 of exemplary method 300, or at step 510 of exemplary methods 500 and 600 (see FIGS. 3, 5, and 6, respectively).

Configuration may further include selecting between an auto-connect and a manual mode. In the manual mode, upon network discovery, the wireless communications module 230 communicates events to host 205, which decides based on the events whether to associate with a network 130 or not. In the auto-connect mode, wireless communications module 230 automatically associates with a preferred network 130 upon discovery. In addition, the auto-connect mode may provide the ability to dynamically control behavior after connecting to an existing network.

As already discussed above in conjunction with method 700 (FIG. 7), configuration features include the ability to set a network scan frequency by wireless communications module 230. This includes providing configurable timing values to control the network scan frequency by the wireless communications module 230. In an embodiment, the timing values are adaptively configurable based on at least one of load on dongle CPU 250 of wireless communications module 230, probe responses received, and beacons received.

As already noted above (for example, in conjunction with method 600, FIG. 6), embodiments of the present invention further provide a mechanism that allows background network scanning by wireless communications module 230 even when the system is associated with a network. The mechanism can be configured to stop or continue scanning after network association. Embodiments further provide the ability to perform active scans (sending out probes) and passive scans (only listening for data packets and/or management packets).

Another feature according to embodiments of the present invention includes automatic network switching by wireless communications module 230 based on configurable parameters, including for example signal strength. Embodiments of the present invention further provide an event filtering mechanism, which determines what events are reported to host module 205 from the wireless communications module 230. This allows greater control of how much and when a host module needs to intervene, resulting in reduced host software complexity, reduced host memory space and CPU requirements, and reduced bus traffic, all resulting in reduced power consumption of the overall system. In an embodiment, event reporting to host module 205 is independent of whether or not the wireless device 110 is associated with a network 130.

9. Exemplary API

In the following, an exemplary communication interface between host module 205 and wireless communications module 230 is described. The communication interface includes a host/dongle Application Programming Interface (API). Example function calls and events used by the host module and the dongle module are described below.

Set_Preferred_Scanlist: This is a function which may be used by host module 230 to set the preferred network scan list and other global parameters at wireless communications module 230. The function allows host 205 to control the behavior of management application 258 at wireless communications module 230. Global data members of the function include:

Number of items in the list—The number of preferred networks to scan for in the preferred network scan list.

Scan frequency—The scan frequency of the management application in scanning for the preferred networks.

Enable adaptive scanning—This is used to enable/disable adaptive scanning (discussed above in conjunction with method 700, FIG. 7).

Adaptive duration 'X'—This is used to set the time duration X (refer to the description of FIG. 7 above).

Adaptive duration 'Y'—This is used to set the time duration Y (refer to the description of FIG. 7 above).

Adaptive duration 'Z'—This is used to set the time duration Z (refer to the description of FIG. 7 above).

Adaptive interval 'T1'—This is used to set the scanning interval T1 (refer to the description of FIG. 7 above).

Adaptive interval 'T2'—This is used to set the scanning interval T2 (refer to the description of FIG. 7 above).

Adaptive interval 'T3'—This is used to set the scanning interval T3 (refer to the description of FIG. 7 above).

Enable background scan—This is used to enable/disable background scanning.

Enable auto network switching—This is used to enable/disable auto-switching. As described above, when enabled, this allows wireless communications module 230 to automatically switch to a more preferred network based on switching criteria.

Switching criteria—This is used to specify switching criteria based on which wireless communications module 230 performs auto-switching. Switching criteria may include ordered list, numerical network priorities, signal strength, connection speed, preferred provider, data packet content criteria, security-type criteria, or other criteria.

'No data' duration—This is used to set the time duration that the wireless communications module 230 waits for before sending an event to host 205 to indicate that no data is being received.

Global event mask—This is used to specify the type of events to report to the host 205 for networks found through background scanning, which are not part of the preferred list.

SSID—This is used to specify the SSID of a network that the host is interested in associating with. Regular expressions are identified by escape sequences '*' and '?', as all octets from 0 to 255 are allowed to appear in 32 bytes, as per standard.

Security Settings—This is used to indicate the security settings that are required to authenticate a given SSID.

Band—This is used to specify the band to use in a multi-band configuration.

Channels—This is a string used to indicate the channels to search within for a given SSID. A null string indicates searching within all channels.

Auto-connect—This is used to enable/disable auto-connect. As described above, this determines whether or not the management application automatically associates with a network from the preferred network list.

Event mask—This is used to specify the type of events to send to the host 205 upon finding a particular network from the preferred network list.

Events used by the wireless communications module 230 include:

No_Network_Found—This is an event sent from the management application to host 205 to indicate its inability to find any of the networks in the preferred network list.

No_Data—This is an event sent from the management application to the host 205 to indicate that it has not received data from the radio card for a specified time period (the time period is specified by the host 205).

Network_Found—This is an event sent from the management application to the host 205 to indicate the availability of a network from the preferred network list.

Network_Lost—This is an event sent from the management application to the host 205 to indicate the disappearing of a network from the preferred network list.

According to embodiments of the present invention, several power management functions can be implemented based on the above described functions and events. For example, when the host 205 receives a 'no network found' or a 'no data available' event from the wireless communications module 230, host 205 can instruct the wireless communications module 230 through out-of-band GPIO 227 to shut down its bus device (e.g., USB/SDIO Device in FIG. 2). The host 205 can further shut down its own bus controller. Subsequently, when any of the bus devices (host bus controller 215 or wireless communications module bus device 235) wants to communicate over the bus 225, it uses the out-of-band GPIO 227 to indicate this desire to communicate to the other side and to wake up the bus.

10. Conclusion

As will be appreciated by persons skilled in the relevant art(s), the system(s) and method(s) described here represent only one possible embodiment of the present invention. Many of the elements described herein could, in alternative embodiments of the present invention, be configured differently within the scope and spirit of the present invention. In addition, additional elements, or a different organization of the various elements, could still implement the overall effect and intent of the present system and method. Therefore, the scope of the present invention is not limited by the above disclosure and detailed embodiments described therein, but rather is determined by the scope of the appended claims.

What is claimed is:

1. In a communications system comprising a host and a wireless communications module coupled to said host, a method for network discovery and connection management comprising:
   delegating from a processor of said host a communications task, wherein said communications task defines a specified network condition and a specified response, said communications task comprising at least one of:
      a task to automate an establishment of a network connection,
      a task to optimize a network connection, and
      a task to report on a network environment;
   receiving at said wireless communications module said communications task;
   performing at said wireless communications module said communications task; and
   performing said specified response by said wireless communications module automatically in response to detection of said specified network condition by said wireless communications module.

2. The method of claim 1, wherein said task further comprises:
   a list comprising:
      a plurality of alternative networks; and
      a criteria for prioritizing said networks;
   a second task to search said network environment for at least an available network of said plurality of networks; and
   a third task to establish said network connection with a highest priority network of said at least an available network, wherein said highest priority network of said at least an available network is a preferred network.

3. The method of claim 2, further comprising:
   receiving said task at said wireless communications module;
   searching said network environment via said wireless communications module for said preferred network; and
   establishing via said wireless communications module said connection with said preferred network.

4. The method of claim 1, further comprising performing said communications task at said wireless communications module in parallel with maintaining an existing network connection via said wireless communications module.

5. The method of claim 4, further comprising:
   defining in said communications task a preferred network connection; and
   monitoring said network environment for said preferred network connection while maintaining said existing network connection.

6. The method of claim 5, further comprising switching said network connection to said preferred network upon a detection of said preferred network.

7. The method of claim 1, further comprising delegating from the processor of said host a communications task of determining at least one of a communications event or a communications status.

8. The method of claim 7, wherein said at least one of said communications status or said communications event comprises at least one of:
   an existing network connection is found;
   said existing network is not found
   a preferred network is found;
   said preferred network is not found;
   a data packet is found;
   said data packet is not found;
   a management packet is found; or
   said management packet is not found.

9. The method of claim 7, further comprising signaling the host with the at least one of the communications status or the communications event.

10. The method of claim 1, further comprising periodically performing said communications task.

11. The method of claim 10, further comprising adjusting a timing between repetitions of said periodic communications task.

12. The method of claim 11, further comprising adjusting said timing in conformance with a detected condition of said network environment.

13. The method of claim 12, further comprising adjusting said timing in conformance with a detection that a current network connection is not found and a preferred network connection is not found.

14. The method of claim 1, further comprising:
   defining in said communications task a specified network condition; and
   notifying said host module when said specified condition is detected by said wireless communications module.

15. The method of claim 1, further comprising configuring said wireless communications module to store a data pertaining to a detected condition of said network environment.

16. The method of claim 1, further comprising:
defining in said communications task a network condition filter criteria; and
reporting from said wireless communications module to said host a detected network condition which conforms to said filter criteria.

17. The method of claim 1, further comprising:
configuring said wireless communications module to recognize a network condition not requiring support from said host; and
in response to said network condition sending a power-consumption reduction command from said wireless communications module to at least one of said host, a processor of said host, a bus of said host, and a radio chip associated with said host.

18. A system for media access control, said system receiving a delegated communications task from a host device, comprising:
a media access control (MAC) device constructed and arranged to receive said delegated communications task, wherein said delegated communications task defines a specified network condition and a specified response;
said MAC device further constructed and arranged to manage a process of network discovery and network connection management according to said delegated communications task, said delegated communications task comprising at least one of:
a task to automate an establishment of a network connection,
a task to optimize a network connection, and
a task to report on a network environments;
said MAC device further constructed and arranged to perform said specified response automatically in response to detection of said specified network condition by said MAC device.

19. The system of claim 18, wherein said MAC device comprises a processor and a memory in communication with said processor, said memory storing a plurality of processing instructions for directing the processor to manage the network environment according to said delegated communications task.

20. The system of claim 18, wherein said MAC device is constructed and arranged to consume less power to perform said communications task than a power required by a processor of said host device to perform said communications task.

21. The system of claim 18, wherein said MAC device is further constructed and arranged to perform said delegated communications task in parallel with maintaining an existing network connection.

22. The system of claim 18, wherein said MAC device is further constructed and arranged to periodically perform said communications task.

23. The system of claim 18, wherein said MAC device is further constructed and arranged to adjust a timing between repetitions of said periodic communications task in conformance with a detected condition of said network environment.

24. The system of claim 18, wherein:
said host device comprises at least one of a processor, a radio chip, and a bus; and
said MAC device is configured and arranged that upon a determination of a lack of network connectivity said MAC device issues a sleep command to at least one of said processor, said radio chip, or said bus.

25. A system for media access control, comprising:
a host module constructed and arranged to delegate a communications task; and
a media access control (MAC) device coupled to said host module;
said MAC device constructed and arranged to receive said delegated communications task, wherein said communications task defines a specified network condition and a specified response;
said MAC device further constructed and arranged to manage a process of network discovery and network connection management according to said delegated communications task and to perform said specified response by said MAC device automatically in response to detection of said specified network condition by said MAC device;
wherein said host module switches to a low power mode after offloading said delegated communications task to said MAC device.

26. The system of claim 25, wherein said host module comprises a first processor, wherein said MAC device is constructed and arranged to consume less power to perform said communications task compared to a power required by said first processor to perform said communications task.

27. In a communications system comprising a host and a wireless communications module coupled to said host, a method for network discovery and connection management comprising:
delegating from a processor of said host a communications task, wherein said communications task defines a specified network condition and a specified response, said communications task comprising at least one of:
a task to automate an establishment of a connection to a preferred network,
a task to detect a preferred network, and
a task to automatically switch a network connection to a preferred network;
receiving at said wireless communications module said communications task;
performing at said wireless communications module said communications task; and
performing said specified response by said wireless communications module automatically in response to detection of said specified. network condition by said wireless communications module.

28. In a communications system comprising a host and a wireless communications module coupled to said host, a method for network discovery and connection management comprising:
delegating from a processor of said host a communications task, wherein said communications task defines a specified network condition and a specified response;
receiving at said wireless communications module said communications task;
performing at said wireless communications module said communications task; and
performing said specified response by said wireless communications module automatically in response to detection of said specified network condition by said wireless communications module.

29. The method of claim 28, wherein the step of delegating the communications task from the processor of the host communications module comprises at least one of:
delegating a task to automate an establishment of a network connection;
delegating a task to optimize a network connection; and
delegating a task to report on a network environment.

30. The method of claim 28, wherein the step of delegating the communications task from the processor of the host communications module comprises at least one of:
- delegating a task to automate an establishment of a connection to a preferred network;
- delegating a task to detect a preferred network; and
- delegating a task to automatically switch a network connection to a preferred network.

31. A system for media access control, said system receiving a delegated communications task from a host device, comprising:
- a media access control (MAC) device constructed and arranged to receive said delegated communications task, wherein said delegated communications task defines a specified network condition and a specified response;
- said MAC device further constructed and arranged to manage a process of network discovery and network connection management according to said delegated communications task and to perform said specified response by said MAC device automatically in response to detection of said specified network condition by said MAC device.

32. In a communications system comprising a host and a wireless communications module coupled to said host, a method for network discovery and connection management comprising:
- delegating from a processor of said host a communications task comprising a task to automate an establishment of a network connection, wherein said communications task defines a specified network condition and a specified response;
- receiving at said wireless communications module said communications task;
- performing at said wireless communications module said communications task and automatically reporting to the processor of said host; and
- performing said specified response by said wireless communications module automatically in response to detection of said specified network condition by said wireless communications module.

* * * * *

UNITED STATES PATENT AND TRADEMARK OFFICE
CERTIFICATE OF CORRECTION

| | | |
|---|---|---|
| PATENT NO. | : 8,305,958 B2 | Page 1 of 1 |
| APPLICATION NO. | : 12/216889 | |
| DATED | : November 6, 2012 | |
| INVENTOR(S) | : Iyer et al. | |

It is certified that error appears in the above-identified patent and that said Letters Patent is hereby corrected as shown below:

Column 26
Line 41, Claim 8, please replace "not found" with --not found;--.

Column 28
Line 44, Claim 27, please replace "specified." with --specified--.

Signed and Sealed this
Twelfth Day of February, 2013

Teresa Stanek Rea
*Acting Director of the United States Patent and Trademark Office*